United States Patent
Kozono et al.

(10) Patent No.: US 8,133,617 B2
(45) Date of Patent: *Mar. 13, 2012

(54) NON-AQUEOUS ELECTROLYTE BATTERY, METHOD OF MANUFACTURING THE SAME AND METHOD OF USING THE SAME

(75) Inventors: Suguru Kozono, Kyoto (JP); Ichiro Tanaka, Kyoto (JP); Shigeki Yamate, Kyoto (JP); Naohiro Tsumura, Kyoto (JP); Yoshihiro Katayama, Kyoto (JP); Toshiyuki Nukuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 6 days.

This patent is subject to a terminal disclaimer.

(21) Appl. No.: 12/085,902

(22) PCT Filed: Dec. 1, 2006

(86) PCT No.: PCT/JP2006/324500
§ 371 (c)(1),
(2), (4) Date: Jun. 2, 2008

(87) PCT Pub. No.: WO2007/064046
PCT Pub. Date: Jun. 7, 2007

(65) Prior Publication Data
US 2009/0246604 A1 Oct. 1, 2009

(30) Foreign Application Priority Data

Dec. 2, 2005 (JP) ................. 2005-349062

(51) Int. Cl.
*H01M 4/58* (2010.01)
*H01M 6/18* (2006.01)

(52) U.S. Cl. ............... 429/231.8; 429/231.1; 429/231.5; 429/329; 429/340; 429/341

(58) Field of Classification Search ............... 429/50, 429/163, 231.95, 213.1, 231.1, 231.5, 231.8, 429/329, 340, 341; *H01M 6/18, 4/58*
See application file for complete search history.

(56) References Cited

U.S. PATENT DOCUMENTS 6,482,550 B1 * 11/2002 Imachi et al. ............... 429/338
2005/0221187 A1 * 10/2005 Inagaki et al. ............. 429/231.95

FOREIGN PATENT DOCUMENTS

| JP | S57-152669 | 9/1982 |
|---|---|---|
| JP | H09-199179 | 7/1997 |
| JP | 2000-348725 | 12/2000 |
| JP | 2001-216962 | 8/2001 |
| JP | 2001-243950 | 9/2001 |
| JP | 2004-087229 | 3/2004 |

OTHER PUBLICATIONS

Machine translation of Kawamoto (JP2000-348725).*
Li et al (A Nanostructured Honeycomb Carbon anode, Journal of the Electrochemical Society, 2003, 150, A979-A984 ).*

* cited by examiner

*Primary Examiner* — Melvin Mayes
*Assistant Examiner* — Jun Li
(74) *Attorney, Agent, or Firm* — Manabu Kanesaka (57) ABSTRACT

A non-aqueous electrolyte battery includes a non-aqueous electrolyte containing an electrolytic salt and a non-aqueous solvent, a positive electrode, and a negative electrode having a negative active material that intercalates/deintercalates lithium ions at a potential not lower than 1.2 V relative to the potential of lithium, wherein a film coat having a carbonate structure and a thickness of not less than 10 nm exists on the surface of the negative electrode. A non-aqueous electrolyte battery is operated in a region of potential of the negative electrode higher than 0.8 V relative to the potential of lithium.

8 Claims, 2 Drawing Sheets

NON-AQUEOUS ELECTROLYTE BATTERY, METHOD OF MANUFACTURING THE SAME AND METHOD OF USING THE SAME

TECHNICAL FIELD

The present invention relates to a non-aqueous electrolyte battery that suppresses gas generation and shows little volume changes.

BACKGROUND ART

Non-aqueous electrolyte batteries, which typically include lithium ion secondary batteries, have recently been and currently are finding practical applications as electrochemical devices showing a high energy density. Ordinary lithium ion secondary batteries have a positive electrode formed by using transition metal oxide as positive active material and a negative electrode formed by using carbon as negative active material and contains an electrolyte salt which is a lithium salt such as $LiPF_6$ and a non-aqueous electrolyte which is a carbonate type organic solvent. However, intercalation/deintercalation of most lithium ions takes place at a potential level lower than the reduction decomposition potential of the non-aqueous solvent to the carbon material. Therefore, while lithium ion secondary batteries show a high energy density, they are accompanied by a problem of a short service life and poor operation characteristics at high temperature.

Proposals have been made to use a negative active material with which intercalation/deintercalation of lithium ions takes place at a potential higher level than the reduction decomposition potential of the non-aqueous solvent. According to these proposals, lithium titanate with which intercalation/deintercalation of lithium ions takes place at about 1.5 V is employed as the negative active material (see, for example, Patent Document 1). Non-aqueous electrolyte batteries employing lithium titanate as negative active material shows an excellent service life and good operation characteristics at high temperature. Many papers have been published and many reports have been made at scientific conferences on non-aqueous electrolyte batteries using lithium titanate as negative active material and such non-aqueous electrolyte batteries have been commercialized as memory backup (see, for example, Non-Patent Document 1, coin-type lithium ion secondary battery (Sony) etc.).

Patent Document 1: JP-B-3502118
Non-Patent Document 1: Journal of Power Sources 146 (2005) 636-639

However, Non-aqueous electrolyte batteries employing lithium titanate as negative active material are accompanied by a problem of gas generation. This problem hardly occurs in coil-type batteries and cylindrical batteries having a very strong battery case but can arise as swollen batteries in the case of flat type batteries and batteries using metal resin laminate film as sheath. A proposal has been made to suppress gas generation by optimizing the carbonic material that is a conductive agent in order to dissolve this problem (see Patent Document 2).

Patent Document 2: JP-A-2005-100770

Patent Document 3 describes on the problem of non-aqueous electrolyte secondary batteries using lithium titanate as negative active material that "It has been found that non-aqueous electrolyte secondary batteries employing lithium titanate and a carbon material respectively as negative active material and conductive agent show poor high temperature characteristics in terms of storage performance and poor cycle characteristics in a high temperature environment because the carbon material and the liquid electrolyte react with each other in the battery in a high temperature environment and a large amount gas is generated. However, this problem does not occur in non-aqueous electrolyte secondary batteries employing a carbon material that occludes and releases lithium for the negative active material. The following finding was obtained as a result of comparing batteries of the two types. When the negative active material is a carbon material, in a charging/discharging cycle, the surface of the carbon material is covered with a film coat. When, on the other hand, the negative active material is lithium titanate, the surface of the lithium titanate and that of the carbonic material are not covered with such a film coat. Therefore, it is assumed that the film coat suppresses the gas generation that arises due to the reaction of the carbon material and the liquid electrolyte. A film coat is formed when the potential of the negative electrode is not higher than the potential of the Li metal by 0.8 V (the potential is relative to the potential of the Li metal hereinafter unless noted otherwise). A particularly high quality film coat is formed when the potential of the negative electrode is not lower than 0.4 V and not higher than 0.5 V. The range of Li occlusion/release potential of a carbon material that occludes and releases lithium is not lower than about 0.1 V and not higher than about 0.9 V and the potential of the negative electrode falls to about 0.1 V in the first charging operation. Therefore, the carbon material and the liquid electrolyte react with each other at a potential of not higher than 0.8 V of the negative electrode to form a film coat, which then stably exists thereafter. On the other hand the range of Li occlusion/release potential of lithium titanate is not lower than about 1.3 V and not higher than about 3.0 V and it is assumed that no film coat is formed. Thus, no film coat is formed on the surface of a negative active material, which may typically be lithium titanate, whose Li occlusion/release potential is higher than the potential of metal lithium by 1 V so that the gas generation due to the reaction of the carbonic material that is a conductive agent and the non-aqueous electrolyte cannot be suppressed." (paragraphs 0014 through 0017). Therefore, the inventors of the above cited invention obviously was not recognizing that the coat film formed on the surface of the negative electrode when a negative active material that intercalates and deintercalates lithium ions at a potential level of not less than 1.2 V relative to the potential of lithium such as lithium titanate is employed.

Furthermore, the above-cited Patent Document describes that "The inventors paid intensive research efforts to find out that a film coat of a high quality showing excellent ion conductivity is formed on the surface of the negative electrode by providing a negative electrode containing lithium titanate and a carbonic material and a non-aqueous electrolyte containing a chain sulfite and thus a non-aqueous electrolyte secondary battery showing excellent high temperature characteristics and large current characteristics can be realized by using them." (paragraph 0018) and also shows that the film coat has a carbonate structure (paragraph 0031, 0033, 0114, 0123). However, the above-cited Patent Document does not clearly describe the thickness of the film coat and a non-aqueous electrolyte containing a particular compound of a chain sulfite needs to be used according to the Patent Document.

Patent Document 3: JP-A-2005-317508

Patent Document 4 describes the problem of non-aqueous electrolyte secondary batteries employing lithium titanate as negative active material as follows. "While no problem arises when a non-aqueous electrolyte secondary battery that employs lithium titanate as negative active material is used for the main power source of a portable appliance, a problem of degraded battery characteristics occurs when the non-aqueous electrolyte secondary battery is used as memory backup power source of an operating voltage of about 3.0 V. The reason for this is presumably as follows. When such a non-aqueous electrolyte secondary battery is used as main power source of a portable appliance, the negative electrode is charged to about 0.1 V relative to the potential of metal lithium in the charging process so that a film coat showing excellent ion conductivity is formed on the surface of the negative electrode and the film coat suppresses the reaction of the negative electrode and the non-aqueous electrolyte and hence prevents the non-aqueous liquid electrolyte from being decomposed and the structure of the negative electrode from being destroyed. On the other hand, when a non-aqueous electrolyte secondary battery is used as memory backup power source whose operating potential is about 3.0 V, the charging process proceeds with a minute electric current of about 1 to 5 µA, maintaining a constant voltage state of about 3.0 V for a long period of time so that the negative electrode is charged only to about 0.8 V relative to the potential of metal lithium. Then, no film coat of the above described type is formed on the negative electrode and the negative electrode and the non-aqueous liquid electrolyte react with each other so that the non-aqueous liquid electrolyte is decomposed and the structure of the negative electrode is destroyed." (see paragraph 0006 and 0007). Thus, while this Patent Document describes that the reaction of the negative electrode and the non-aqueous liquid electrolyte is suppressed in a non-aqueous electrolyte secondary battery employing lithium titanate as negative active material by the film coat formed on the surface of the negative electrode when the negative electrode is charged to about 0.1 V relative to the potential of metal lithium but it does not describe the use of a battery whose negative electrode is charged to about 0.1 V and on which a film coat is formed within a region of potential of the negative electrode higher than 0.8 V relative to the potential of metal lithium. To the contrary, the above-cited Patent Document is based on the fact that no film coat is formed on the surface of the negative electrode of a battery that is operated in a region of potential of the negative electrode higher than 0.8 V relative to the potential of metal lithium. In other words, those skilled in the art can hardly come to an idea of using a battery in which a film coat is formed on the negative electrode in a region of potential of the negative electrode higher than 0.8 relative to the potential of metal lithium because they think that there is a good reason for not using such a battery in such a way.

Additionally, since neither gas generation nor appearance of a swollen battery can be suppressed sufficiently when a battery in which a film coat is formed on the negative electrode is used in a region of potential of the negative electrode higher than 0.2 V relative to the potential of metal lithium as will be described in Examples of this specification, those skilled in the art cannot predict that gas generation and appearance of a swollen battery can be suppressed that by using a battery in which a film coat is formed on the negative electrode in a region of potential of the negative electrode higher than 0.8 V relative to the potential of metal lithium.

Furthermore, the above-cited Patent Document describes that "When a lithium/transition metal composite oxide expressed by $LiMn_xNi_yCo_zO_2$ (x+y+z=1, $0 \leq x \leq 0.5$, $0 \leq y \leq 1$, $0 \leq z \leq 1$) is used as positive active material of the positive electrode and the mass ratio of the above described negative active material relative to the positive active material is not smaller than 0.57 and not greater than 0.95, the voltage at the negative electrode at the end of a charging process comes to about 0.8 V relative to the potential of metal lithium so that the non-aqueous liquid electrolyte is prevented from reacting with the negative electrode to become decomposed and the structure of the negative electrode is prevented from being destroyed in a case where the negative electrode is charged while a constant voltage state of about 3.0 V is being maintained . . . " (paragraph 0022). Thus, since "the voltage at the negative electrode at the end of a charging process comes to about 0.8 V relative to the potential of metal lithium", no film coat is formed on the surface of the negative electrode as seen from the description of the paragraph 0007 of the above-cited Patent Document and hence those skilled in the art cannot come to an idea of forming a film coat on the surface of the negative electrode to suppress gas generation.

Patent Document 4: JP-A-2005-317509

DISCLOSURE OF THE INVENTION

Problem to be Solved by the Invention

As shown in Examples, gas generation is not suppressed sufficiently simply by optimizing the conductive agent. The gas generation that arises in a lithium ion secondary battery when lithium titanate is employed as negative active material is presumably related at least to lithium titanate. In other words, the gas generation probably cannot be suppressed sufficiently without improving the negative electrode of lithium titanate.

Thus, the problem to be solved by this invention is to suppress gas generation in a non-aqueous electrolyte battery having a negative active material that intercalates and deintercalates lithium ions at a potential not lower than 1.2 V relative to the potential of lithium for the negative electrode thereof.

Means for Solving the Problem

According to the present invention, the above problem is dissolved by providing the followings.

(1) A non-aqueous electrolyte battery comprising a non-aqueous electrolyte containing an electrolytic salt and a non-aqueous solvent, a positive electrode and a negative electrode having a negative active material that intercalates/deintercalates lithium ions at a potential not lower than 1.2 V relative to the potential of lithium, characterized in that a film coat having a carbonate structure and a thickness of not less than 10 nm exists on the surface of said negative electrode and that the non-aqueous electrolyte battery is operated in a region of potential of the negative electrode higher than 0.8 V relative to the potential of lithium.

(2) The non-aqueous electrolyte battery as defined in (1) above, characterized in that the thickness of the film coat having a carbonate structure is not less than 20 nm.

(3) The non-aqueous electrolyte battery as defined in (1) or (2) above, characterized in that said negative active material is spinel type lithium titanate.

(4) The non-aqueous electrolyte battery as defined in any one of (1) through (3) above, characterized in that the potential of the negative electrode is lowered to not higher than 0.8 V relative to the potential of lithium at least once to bring a film coat having a carbonate structure into existence on the surface of the negative electrode.

(5) The non-aqueous electrolyte battery as defined in (4), characterized in that the battery is so designed that the potential of the positive electrode is not higher than 4.5 V relative to the potential of lithium when the potential of the negative electrode is not higher than 0.8 V relative to the potential of lithium.

(6) The non-aqueous electrolyte battery as defined in any one of (1) through (5) above, characterized in that there exists lithium showing a spin-lattice relaxation time ($T_1$) of not less than 1 second as determined by a solid Li-NMR observation in said negative active material.

(7) The non-aqueous electrolyte battery as defined in any one of (1) through (6) above, characterized in that the current collector of said negative electrode is made of copper, nickel or an alloy of them.

(8) A method of manufacturing a non-aqueous electrolyte battery having an non-aqueous electrolyte containing an electrolytic salt and a non-aqueous solvent, a positive electrode and a negative electrode having a negative active material that intercalates/deintercalates lithium ions at a potential not lower than 1.2 V relative to the potential of lithium, characterized in that a film coat having a carbonate structure is brought into existence on the surface of said negative electrode by lowering the potential of the negative electrode to lower than 0.8 V relative to the potential of lithium at least once in an initial cycle.

(9) The method of manufacturing a non-aqueous electrolyte battery as defined in (8) above, characterized in that the thickness of the film coat having a carbonate structure is not less than 10 nm.

(10) The method of manufacturing a non-aqueous electrolyte battery as defined in (8) or (9) above, characterized in that said negative active material is spinel type lithium titanate.

(11) The method of manufacturing a non-aqueous electrolyte battery as defined in any one of (8) through (10) above, characterized in that the potential of the negative electrode is lowered to not higher than 0.8 V relative to the potential of lithium by raising the charging voltage at an initial cycle than its operating.

(12) The method of manufacturing a non-aqueous electrolyte battery as defined in (11), characterized in that the battery is so designed that the potential of the positive electrode is not higher than 4.5 V relative to the potential of lithium when the potential of the negative electrode is not higher than 0.8 V relative to the potential of lithium.

(13) The method of manufacturing a non-aqueous electrolyte battery as defined in any one of (8) through (12) above, characterized in that lithium showing a spin-lattice relaxation time ($T_1$) of not less than 1 second as determined by a solid Li-NMR observation is brought into existences in said negative active material by lowering the potential of the negative electrode to not higher than 0.8 V relative to the potential of lithium at least once in an initial cycle.

(14) A method of using a non-aqueous electrolyte battery, characterized in that the non-aqueous electrolyte battery is operated in a region of potential of the negative electrode higher than 0.8 V relative to the potential of lithium.

For the purpose of the present invention, "a negative active material that intercalates/deintercalates lithium ions at a potential not lower than 1.2 V relative to the potential of lithium" refers to "an active material that practically does not show any reaction of intercalating/deintercalating lithium ions at a potential lower than 1.2 V relative to the potential of lithium but exclusively shows a reaction of intercalating/deintercalating lithium ions at a potential not lower than 1.2 V relative to the potential of lithium". More specifically, it refers to "an active material that shows a reaction of intercalating/deintercalating lithium ions at a potential not lower than 1.2 V relative to the potential of lithium, accompanying an electrochemical capacity of at least not less that 100 mAh/g per unit weight of the active material".

Since known non-aqueous electrolyte batteries employing a negative active material that intercalates/deintercalates lithium ions at a potential not lower than 1.2 V are operated in a region of relatively high potential so that the non-aqueous solvent can hardly be subjected to reduction decomposition and hence a film coat having a carbonate structure does not exist or hardly exist on the surface of the negative electrode. To the contrary, a non-aqueous electrolyte battery according to the present invention is characterized in that a film coat having a carbonate structure and a thickness of not less than 10 nm is brought into existence on the surface of said negative electrode in advance by way of an electrochemical, chemical or physical process as described in (1) above.

Preferably, as described in (4), (5), (7), (10) and (11) above, a film coat having a carbonate structure is brought into existence on the surface of said negative electrode by way of an electrochemical process.

For the purpose of the present invention, "an initial cycle" refers to a charging/discharging cycle that is conducted in the process of manufacturing the non-aqueous electrolyte battery.

Advantage of the Invention

A non-aqueous electrolyte battery according to the invention employs a negative electrode having a negative active material that intercalates/deintercalates lithium ions at a potential not lower than 1.2 V relative to the potential of lithium and a film coat having a certain thickness and a carbonate structure existing on the surface of the negative electrode and hence the present invention can provide a non-aqueous electrolyte battery that suppresses gas generation and shows excellent performances.

BEST MODE FOR CARRYING OUT THE INVENTION

Now, the positive electrode, the negative electrode, the separator and the non-aqueous electrolyte of a non-aqueous electrolyte battery according to the present invention will be described below.

Materials that can be used as positive active material non-limitatively include various oxides and sulfides. Examples of material that can be used for the positive electrode include manganese dioxide ($MnO_2$), iron oxide, copper oxide, nickel oxide, lithium-manganese composite oxide (e.g., $Li_xMn_2O_4$ or $Li_xMnO_2$), lithium-nickel composite oxide (e.g., $Li_xNiO_2$), lithium-cobalt composite oxide (e.g., $Li_xCoO_2$), lithium-nickel-cobalt composite oxide (e.g., $LiNi_{1-y}Co_yO_2$), lithium transition metal composite oxide (e.g., $LiNi_xCo_yMn_{1-y-z}O_2$), spinel-type lithium-manganese-nickel composite oxide ($Li_xMn_{2-y}Ni_yO_4$), lithium-phosphorous oxide having an olivine structure ($Li_xFePO_4$, $Li_xFe_{1-y}Mn_yPO_4$, $Li_xCoPO_4$, etc.), iron sulfate ($Fe_2(SO_4)_3$) and vanadium oxide (e.g., $V_2O_5$). Other materials that can be used for the positive electrode include organic and inorganic materials such as electro-conductive polymers such as polyaniline and polypyrrole, disulfide based polymers, sulfur (S) and carbon fluoride.

Examples of conductive agent that can be used for the positive electrode include acetylene black, carbon black and graphite. Examples of binding agent that can be used for the positive electrode include polytetrafluoroethylene (PTFE), polyvinylidene difluoride (PVdF) and fluorine based rubber.

Examples of current collector material that can be used for the positive electrode include aluminum and aluminum alloys.

Materials that can be used as negative active material include those that intercalate/deintercalate lithium ions at a potential not lower than 1.2 V relative to the potential of lithium. Examples of material that can be used for the negative electrode include molybdenum oxide, iron sulfide, titanium sulfide and lithium titanate. For the purpose of the present invention, lithium titanate having a spinel type structure expressed by chemical formula of $Li_{4+x}Ti_5O_{12}$ ($0 \leq x \leq 3$) is preferable.

Examples of conductive agent that can be used for the negative electrode include acetylene black, carbon black and graphite. Examples of binding agent that can be used for the negative electrode include polytetrafluoroethylene (PTFE), polyvinylidene fluoride (PVdF) and fluorine based rubber.

Aluminum that is a popular current collector material is alloyed with lithium at a potential not lower than 0.4V. Therefore, a metal or an alloy of the metal that is not alloyed with lithium is preferably selected for the current collector. Examples of such material include copper, nickel and alloys of such metals.

It is important for a non-aqueous electrolyte battery according to the present invention to bring a film coat having a carbonate structure and a predetermined thickness into existence on the surface of the negative electrode in order to prevent a swollen non-aqueous electrolyte battery from appearing due to gas generation.

While such a film coat can be formed by way of an electrochemical process as will be illustrated in the examples shown below, it may alternatively be formed by way of a chemical or physical process. Such a film coat can be applied for the purpose of the present invention regardless of the positive active material.

The thickness of the film coat is preferably not less than 10 nm, more preferably not less than 20 nm, for the purpose of preventing a swollen non-aqueous electrolyte battery from appearing.

When a film coat having a carbonate structure is formed on the surface of the negative electrode by way of an electrochemical process, a technique of lowering the potential of the negative electrode to lower than 0.8 V relative to the potential of lithium at least once before operating the non-aqueous electrolyte battery (in an initial cycle) can be adopted.

A non-aqueous electrolyte battery according to the present invention is operated in a region of potential of the negative electrode higher than 0.8 V relative to the potential of lithium as pointed out above. However, the potential of the negative electrode can be lowered to a level not higher than 0.8 V relative to the potential of lithium by raising the charging voltage in an initial cycle above the operating voltage.

For the purpose of the present invention, the potential of the negative electrode is preferably not higher than 0.8 V, more preferably not higher than 0.3 V, relative to the potential of lithium because a coat film having a carbonate structure can be brought into existence with ease on the surface of the negative electrode by way of reduction decomposition of the non-aqueous solvent having a carbonate structure when the potential of the negative electrode is not higher than 0.8 V relative to the potential of lithium.

The above-described method can be realized by causing the solvent of the non-aqueous electrolyte to contain a non-aqueous solvent having a carbonate structure.

Alternatively, the electrode group may be formed after conducting a coat film forming step on the negative electrode by means of a battery prepared separately.

Lithium showing a spin-lattice relaxation time ($T_1$) of not less than 1 second as determined by a solid Li-NMR observation is brought into existence in the negative active material by lowering the potential of the negative electrode to lower than 0.8 V relative to the potential of lithium. This is a mode of existence of lithium that has never been observed in conventional non-aqueous electrolyte batteries as will be described in greater detail hereinafter.

Separators that can be used for the purpose of the present invention include porous film containing polyethylene, polypropylene, cellulose or polyvinylidene fluoride (PVdF) and unwoven fabric made of synthetic resin.

Examples of electrolytic salt that can be used for the purpose of the present invention include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$) and lithium-bis-(trifluoromethylsulfonyl)imide [$LiN(CF_3SO_2)_2$].

Examples of non-aqueous solvent (organic solvent) that can be used for the purpose of the present invention include cyclic carbonates such as ethylene carbonate (EC), propylene carbonate (PC) and vinylene carbonate (VC), chain carbonates such as dimethyl carbonate (DMC) and methylethyl carbonate (MEC) and diethyl carbonate (DEC), cyclic ethers such as tetrahydrofuran (THF) and 2-methyltetrahydrofuran (2MeTHF), chain ethers such as dimethoxyethane (DME), γ-butylolactone (BL), acetonitrile (AN) and sulfolane (SL). A room temperature molten salt containing lithium ions can also be used as non-aqueous electrolyte for the purpose of the present invention.

Now, the present invention will be described in greater detail by way of examples and comparative examples, which, however, does not limit the spirit and scope of the present invention by any means.

EXAMPLE I

Comparative Example Batteries 1 through 4 and Example Batteries 1 through 3 as described below were prepared as non-aqueous electrolyte batteries.

Comparative Example Battery 1

Preparation of Positive Electrode

Powder of lithium/transition metal composite oxide ($LiNi_{1/3}Co_{1/3}Mn_{1/3}O_2$), which was to operate as positive active material, acetylene black and polyvinylidene fluoride (PVdF) were mixed by 90 mass %, 5 mass % and 5 mass % respectively and added to N-methylpyrrolidone (NMP) to form slurry, which slurry was then applied to the both surfaces of a current collector, which was a piece of aluminum foil of 20 μm, to make it show an electrode density of 26 mg/cm$^2$ (excluding the current collector), dried and pressed to form a positive electrode.

<Preparation of Negative Electrode>

Powder of spinel type lithium titanate ($Li_4Ti_5O_{12}$), which was to operate as negative active material, acetylene black and polyvinylidene fluoride (PVdF) were mixed by 85 mass %, 7 mass % and 8 mass % respectively and added to N-methylpyrrolidone (NMP) to form slurry, which slurry was then applied to the both surfaces of a current collector, which was a piece of copper foil of 10 µm, to make it show an electrode density of 27 mg/cm$^2$ (excluding the current collector), dried and pressed to form a negative electrode.

<Preparation of Non-Aqueous Electrolyte>

Lithium hexafluorophosphate (LiPF$_6$) was dissolved into a mixture solvent of a mixture of ethylene carbonate and diethyl carbonate of the same volumes to a concentration of 1 mol/litter to prepare a non-aqueous electrolyte.

<Preparation of Battery>

The positive electrode, a porous separator of polyethylene and the negative electrode were wound flat to form an electrode group. The electrode group was contained in an aluminum-made battery case can showing a height of 49.3 mm, a width of 33.7 mm and a thickness of 5.17 mm. The non-aqueous electrolyte was injected into the battery case can by 3.5 g in a vacuum condition and subsequently left at 25° C. for 60 minutes. Then, an "initial cycle" process was executed. In the initial cycle process, the battery was electrically charged by way of a constant current/constant voltage charging process, using a current value of 100 mA and a voltage of 2.5 V, at 25° C. for 20 hours, left still for 30 minutes and then electrically discharged by an constant current discharging operation, using a current value of 100 mA, to a final voltage of 1.0 V. At the end of the 2.5 V charging step of the battery, the potential of the positive electrode and that of the negative electrode were about 4.0 V and 1.5 V relative to the potential of lithium respectively. The above charging/discharging cycle was repeated three times. Thereafter, the battery case can was sealed. Comparative Battery 1 was prepared in this way. After the preparation, the battery was subjected to one charging/discharging cycle in the same charging/discharging condition as the initial cycle.

Comparative Example Battery 2

Comparative Example Battery 2 was prepared in a manner same as Comparative Example Battery 1 except that a non-aqueous electrolyte prepared by dissolving lithium hexafluorophosphate (LiPF$_6$) into a mixture solvent of a mixture of propylene carbonate and diethyl carbonate of the same volumes to a concentration of 1 mol/litter.

Comparative Example Battery 3

Comparative Example Battery 3 was prepared in a manner same as Comparative Example Battery 2 except that the acetylene black was replaced by coke (interplanar spacing (d$_{002}$): 0.350 nm, crystallite size in c-axis direction (Lc): 2 nm) as conductive agent in the negative electrode. After the preparation, the battery was electrically charged and discharged.

Comparative Example Battery 4

Comparative Example Battery 4 was prepared in a manner same as Comparative Example Battery 2 except that the negative active material was applied to show a negative electrode density of 21 mg/cm$^2$ (excluding the current collector) and 4.1 V was used for the charging voltage in the "initial cycle". At the end of the 4.1 V charging step of the battery, the potential of the positive electrode and that of the negative electrode were about 4.3 V and 0.2 V relative to the potential of lithium respectively. After the preparation, the battery was subjected to one charging/discharging cycle in the same charging/discharging condition as the initial cycle.

Example Battery 1

Example Battery 1 was prepared in a manner same as Comparative Example Battery 1 except that the negative active material was applied to show a negative electrode density of 21 mg/cm$^2$ (excluding the current collector) and 4.1 V was used for the charging voltage in the "initial cycle". At the end of the 4.1 V charging step of the battery, the potential of the positive electrode and that of the negative electrode were about 4.3 V and 0.2 V relative to the potential of lithium respectively. After the preparation, the battery was subjected to one charging/discharging cycle in the same charging/discharging condition as the initial cycle except that 2.5 V was used for the charging voltage. At the end of the 2.5 V charging step, the potential of the positive electrode and that of the negative electrode were about 4.0 V and 1.5 V relative to the potential of lithium respectively.

Example Battery 2

Example Battery 2 was prepared in a manner same as Comparative Example Battery 4. After the preparation, the battery was subjected to one charging/discharging cycle in the same charging/discharging condition as the initial cycle except that 2.5 V was used for the charging voltage. At the end of the 2.5 V charging step, the potential of the positive electrode and that of the negative electrode were about 4.0 V and 1.5 V relative to the potential of lithium respectively.

Example Battery 3

Example Battery 3 was prepared in a manner same as Example Battery 2 except that the positive active material was applied to show a positive electrode density of 23 mg/cm$^2$ (excluding the current collector) and 4.3 V was used for the charging voltage in the "initial cycle". After the preparation, the battery was subjected to one charging/discharging cycle in the same charging/discharging condition as the initial cycle except that 2.7 V was used for the charging voltage. At the end of the 4.3 V charging step, the potential of the positive electrode and that of the negative electrode were about 4.5 V and 0.2 V relative to the potential of lithium respectively and, at the end of the 2.7 V charging step, the potential of the positive electrode and that of the negative electrode were about 4.2 V and 1.5 V relative to the potential of lithium respectively.

Table 1 below summarily shows the charging voltage, the potential of the positive electrode and that of the negative electrode (vs. Li/Li$^+$) for the charging voltage in operating, and, the charging voltage (V), the potential of the positive electrode and that of the negative electrode (vs. Li/Li$^+$) for the charging voltage in the initial cycle (before sealing the battery case can) for each of Comparative Example Batteries 1 through 4 and Example Batteries 1 through 3.

A large number of finished batteries (batteries sealed after the initial cycle) same as each of Comparative Example Batteries 1 through 4 and Example Batteries 1 through 3 were prepared and the state of charge (SOC) was adjusted to 100% by way of a constant current/constant voltage charging process of 20 hours. A temperature of 25° C., a charging current of 100 mA and the charging voltages in operation shown in Table 1 were used for the constant current/constant voltage charging process. Then, all the batteries were gauged for the thickness at a central part and each of the batteries was put into a thermostat bath at 25° C. and left there still for 2 weeks.

After the still storage, all the batteries were taken out and left at 25° C. for a full day before they were gauged for the thickness at a central part.

Meanwhile, Comparative Example Batteries 1 through 4 and Example Batteries 1 through 3 (batteries after an initial cycle) were prepared separately and the negative electrode plates were taken out. The surface of each of the negative electrodes were observed by means of an X-ray photoelectron spectrometer (XPS) to analyze the components and the thickness of the film coat having a carbonate structure and laid on the negative electrode was gauged. The gauged thicknesses (nm) of the film coats are also shown in Table 1.

entire surface of the negative electrode plate (lithium titanate) to prove that there was not any lithium titanate that did not have any surface film coat when the battery was operated with 0.2 V.

X-rays are irradiated onto the specimen and data on the reflecting thereof are observed in an XPS observation. Since X-rays show a minimum depth of incidence of 10 nm, information on a surface area within the depth of 10 nm can be obtained as averaged data in the initial stages of observation.

Information on the film coat having a carbonate structure and information on the active material appeared from the very start of observation from the specimens indicated by "5 nm"

TABLE 1

| Battery | Negative electrode conductive agent | liquid electrolyte | In operation | | | In initial cycle | | | Change in central part thickness | Film coat thickness on negative electrode surface (nm) |
|---|---|---|---|---|---|---|---|---|---|---|
| | | | Battery voltage | Positive electrode potential | Negative electrode potential | Battery voltage | Positive electrode potential | Negative electrode potential | | |
| Comp. Ex. 1 | AB | 1M LiPF$_6$ EC:DEC = 1:1 | 2.5 | 4.0 | 1.5 | 2.5 | 4.0 | 1.5 | x | 5 |
| Comp. Ex. 2 | AB | 1M LiPF$_6$ PC:DEC = 1:1 | 2.5 | 4.0 | 1.5 | 2.5 | 4.0 | 1.5 | x | 5 |
| Comp. Ex. 3 | Coke | 1M LiPF$_6$ PC:DEC = 1:1 | 2.5 | 4.0 | 1.5 | 2.5 | 4.0 | 1.5 | Δ | 5 |
| Comp. Ex. 4 | AB | 1M LiPF$_6$ PC:DEC = 1:1 | 4.1 | 4.3 | 0.2 | 4.1 | 4.3 | 0.2 | Δ | 20 |
| Example 1 | AB | 1M LiPF$_6$ EC:DEC = 1:1 | 2.5 | 4.0 | 1.5 | 4.1 | 4.3 | 0.2 | ○ | 20 |
| Example 2 | AB | 1M LiPF$_6$ PC:DEC = 1:1 | 2.5 | 4.0 | 1.5 | 4.1 | 4.3 | 0.2 | ○ | 25 |
| Example 3 | AB | 1M LiPF$_6$ PC:DEC = 1:1 | 2.7 | 4.2 | 1.5 | 4.3 | 4.5 | 0.2 | ○ | 20 |

○: +0.0 to +0.1 mm
Δ: +0.1 to +0.3 mm
x: +0.3 mm or more

From Table 1, it will be seen that the increase in the battery thickness was remarkably suppressed on the batteries (Example Batteries 1 through 3) showing a negative electrode potential of 0.2 V (not higher than 0.8 V) relative to the potential of lithium at the end of the charging step in the initial cycle, a negative electrode potential of 1.5 V (higher than 0.8 V) relative to the potential of lithium at the end of the charging step in operation and a thickness 20 nm of the film coat on the surface of the negative electrode if compared with the batteries (Comparative Example Batteries 1 and 2) showing a negative electrode potential of 1.5 V relative to the potential of lithium at the end of the charging step in the initial cycle if the same conductive agent was used for the negative electrodes.

Additionally, the increase in the battery thickness was not suppressed sufficiently when the negative electrode potential is held to 0.2 V after the end of the charging step in operation as in the case of Comparative Example Battery 4. Therefore, it is preferable to operate the battery in a region of potential of the negative electrode higher than 0.8 V (about 1.5 V) relative to the potential of lithium in order to suppress the increase in the battery thickness as in the case of Example Batteries 1 and 2.

The increase in the battery thickness was suppressed to some extent but not sufficiently when coke was employed as conductive agent (Comparative Example Battery 3), although the negative electrode potential was 1.5 V relative to the potential of lithium at the end of the charging step in the initial cycle, if compared with the battery where acetylene black was used as conductive agent (Comparative Example Battery 2).

As seen from Table 1, while a very thin film coat that was partly about 5 nm thick was observed on the surface of the negative electrode plate (lithium titanate) when the battery was operated with 1.5 V in the 3 initial cycles, a film coat with a thickness of not less than 20 nm that contained at least a component having a carbonate structure was found on the (Comparative Example Batteries 1 and 2). Therefore, it was clear that the thickness of the film coat was less than 10 nm for the both specimens. The thickness was estimated to be about 5 nm from the intensity ratio of the two pieces of information.

As for Comparative Example Battery 3 and Example Batteries 1 and 2, no information on the active material was obtained but only information on the film coat having a carbonate structure appeared at the start of observation. Therefore, it was clear that the thickness of the film coat was not less than 10 nm for all the specimens. Thereafter, each of the specimens was observed, while digging the specimen at a rate of 2 nm per minute by Ar sputtering to see the depth at which information on the active material started appearing concurrently. The thickness of the film coat was determined in this way.

EXAMPLE II

Example Battery 4 and Comparative Example Batteries 5 and 6 as described below were prepared as non-aqueous electrolyte batteries.

Example Battery 4

Example Battery 4 was prepared in a manner same as Example Battery 2. The battery was electrically charged and discharged after the preparation. Subsequently, the spin-lattice relaxation time ($T_1$) of the specimen was determined by a solid Li-NMR observation as described below.

<Solid Li-NMR Observation>

The battery was disassembled at the end of the above-described discharging operation in an argon box and the negative electrode was taken out. The negative electrode composite was sampled from the negative electrode current collector and subjected to a solid high resolution 7 Li-NMR observation.

A CMX-300 Infinity (7.05 teslas) (trademark, available from Chemagnetics) and the MAS (magic angle spinning) technique were used for the solid high resolution 7 Li-NMR observation. A 4 mmφ sample tube probe was used and the observation was conducted at room temperature (about 25° C.) in a dry nitrogen gas atmosphere with a resonance frequency of 116.1996480 MHz and a sample spinning rate of 13 kHz.

The inversion recovery method was used for gauging the spin-lattice relaxation time ($T_1$). In the measurement, a 180° pulse was irradiated and the Z-component of magnetization was inverted, while an appropriate waiting time was selected, to observe the relaxation where the Z-component of magnetization recovered for equilibrium.

Figure 1:
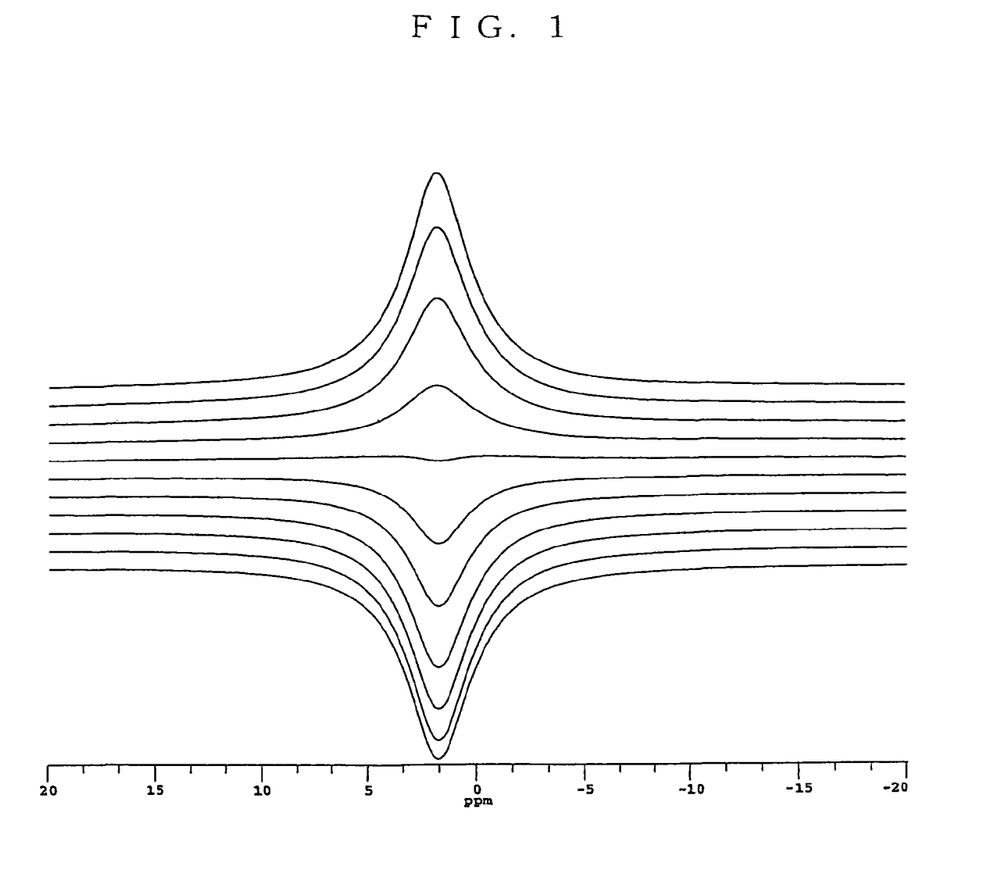
FIG. 1 is a graph illustrating the observed spectrum of the spin-lattice relaxation time ($T_1$) of the negative active material used in Example Battery 4.

When the waiting time was changed by several steps, a spectrum that corresponds to the waiting time was obtained. FIG. 1 shows the spectrum obtained by changing the waiting time for Example Battery 4. A relaxation curve is obtained by plotting the peak intensities of the observed peak tops relative to the waiting time. The relaxation curve is expressed by the formula shown below when the observed sample is a multicomponent system having n phase components that show various spin-lattice relaxation times ($T_1$).

$$\langle X_0 \rangle j = \left\{ \sum_{i=1}^{n} Ai \times \exp(-t/T_1 i) \right\}$$

where
$\langle X_0 \rangle j$: the peak intensity of the spectrum for the j-th data,
n: the number of components,
Ai: the peak intensity of the i-th component,
t: waiting time and
$T_1 i$: the spin-lattice relaxation time of the i-th component.

Figure 2:
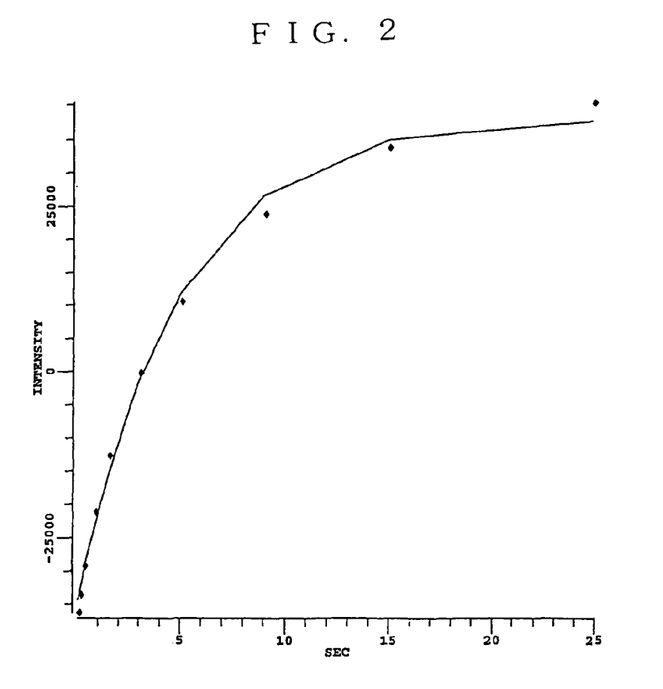
FIG. 2 is a graph illustrating the results of analysis of the spin-lattice relaxation time ($T_1$) of the negative active material used in Example Battery 4 (an instance where Li having one relaxation time is assumed to exist).
Figure 3:
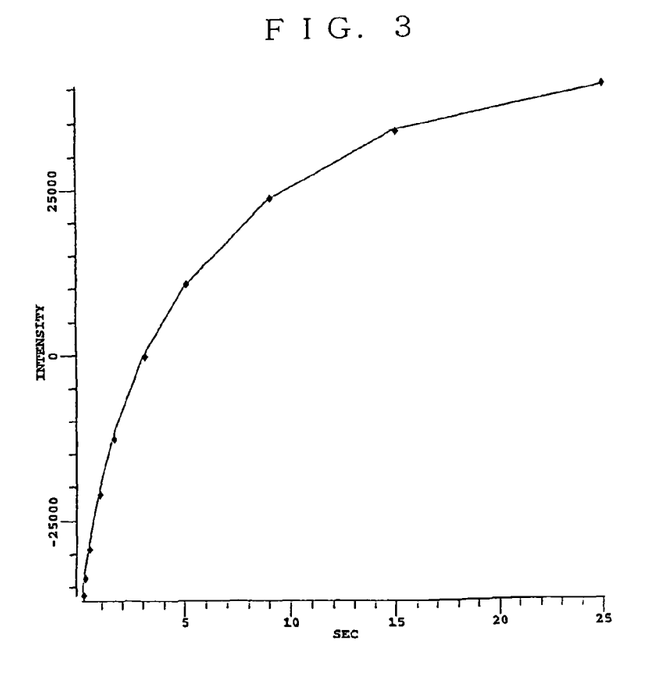
FIG. 3 is a graph illustrating the results of analysis of the spin-lattice relaxation time ($T_1$) of the negative active material used in Example Battery 4 (an instance where Li having two different relaxation times is assumed to exist).

In order to determine n, Ai, $T_1$ and i, the peak intensities plotted relative to the waiting time was subjected to nonlinear optimization, using a simplex process. A technique of assuming several components and using the value of the spin-lattice relaxation time of each of the components and the relative quantity thereof as variables (analysis by histogram) was employed. FIGS. 2 and 3 summarily show the results of analysis obtained for Example Battery 4 when n=1 was assumed and those obtained for Example Battery 4 when n=2 was assumed. The plots and the results agreed with each other well when n=2 was used for analysis. Therefore n=2 was selected (and hence it was assumed that there existed Li having two different relaxation times).

Comparative Example Battery 5

Comparative Example Battery 5 was prepared in a manner same as Comparative Example Battery 2 and, after the preparation, electrically charged and discharged. Subsequently, the spin-lattice relaxation time ($T_1$) of the specimen was determined by a solid Li-NMR observation as in the case of Example Battery 4.

Comparative Example Battery 6

Comparative Example Battery 6 was prepared in a manner same as Example Battery 2 except that the negative active material was changed to a mixture of 90 mass % of hard carbon powder and 10 mass % of polyvinylidene fluoride and applied to show a negative electrode density of 20 mg/cm$^2$ (excluding the current collector). At the end of the 4.1 V charging process, the positive electrode potential and the negative electrode potential were 4.3 V and 0.2 V respectively relative to the potential of lithium. The battery was electrically charged by way of a constant current/constant-voltage charging process, using a current value of 100 mA and a voltage of 4.1 V, at 25° C. for 20 hours, left still for 30 minutes and then electrically discharged by an constant current/constant voltage discharging operation, using a current value of 100 mA, to a final voltage of 2.5 V. The above charging/discharging cycle was repeated three times. Subsequently, the spin-lattice relaxation time ($T_1$) of the specimen was determined by a solid Li-NMR observation as in the case of Example Battery 4.

The spin-lattice relaxation time ($T_1$) of each of Example Battery 4 and Comparative Example Batteries 5 and 6 obtained as a result of the observation are listed in Table 2.

TABLE 2

| Battery | Negative active material | Achieved lowest potential of negative electrode (V) | 1 to 2 ppm relaxation time (sec) | Ratio of existence (%) | Average relaxation time (sec) |
|---|---|---|---|---|---|
| Example Battery 4 | lithium titanate | 0.2 | 7.68 | 78 | 6.25 |
| | | | 1.08 | 22 | |
| Comparative Example Battery 5 | lithium titanate | 1.5 | 0.46 | 61 | 0.38 |
| | | | 0.26 | 39 | |
| Comparative Example Battery 6 | hard carbon | 0.2 | 0.41 | 39 | 0.24 |
| | | | 0.13 | 61 | |

As a result of the solid Li-NMR observation, a peak was observed at or near 0 ppm in each of the specimens to indicate that the chemical shift of the peak of the Li ion component contained in the lithium titanate or the hard carbon was same for all the specimens, although the Li ion component contained in the hard carbon of Comparative Example Battery 6 showed a broad peak profile if compared with the Li ion component contained in the lithium titanate of either of the other batteries.

As for the spin-lattice relaxation time ($T_1$), the existence of Li showing large values of spin-lattice relaxation time ($T_1$) of 7.68 seconds and 1.08 seconds (not less than 1 second) was confirmed for the peak position of 1 to 2 ppm in Example Battery 4, which employed lithium titanate for the negative active material and whose negative electrode potential was 0.2 V (not higher than 0.8 V) relative to the potential of lithium at the end of the charging process in the initial cycle, whereas only the existence of Li showing values of spin-lattice relaxation time ($T_1$) less than 1.00 second, or 0.46 seconds and 0.26 seconds, was confirmed in Comparative Example Battery 5, whose negative electrode potential was 1.5 V relative to the potential of lithium at the end of the charging process in the initial cycle. Furthermore, when carbon was employed for the negative active material, no existence of Li showing large values of spin-lattice relaxation time ($T_1$) was confirmed if the negative electrode potential was 0.2 V relative to the potential of lithium at the end of the charging process in the initial cycle. From the above, it may be safe to assume that Li showing large values of spin-lattice relaxation time ($T_1$) captures part of the Li existing in the lithium titanate.

Large values of spin-lattice relaxation time ($T_1$) of Li indicate that the Li shows a poor mobility. Therefore, as a result of deep charging of achieving 0.2 V for the negative electrode potential relative to the potential of lithium at the end of the charging process in the initial cycle, presumably some of the Li atoms enter deep into the lithium titanate crystal so that the crystal structure is microcosmically changed around the Li atoms entering deep into the lithium titanate crystal to make the Li atoms hardly movable.

Thus, as a non-aqueous electrolyte battery according to the present invention employs a negative active material that intercalates/deintercalates lithium ions at a potential not lower than 1.2 V and contains hardly movable lithium ions, presumably gas generation is suppressed and the increase in the battery thickness is remarkably suppressed.

When a carbon material is used as the negative active material of a non-aqueous electrolyte battery, a film coat is formed on the surface of the negative electrode by making the negative electrode potential not higher than 0.8 V relative to the potential of lithium at the end of the charging process in the initial cycle. However, the state of existence of lithium (Li) differs between such a non-aqueous electrolyte battery and a non-aqueous electrolyte battery that employs a negative active material adapted to intercalate/deintercalate lithium ions at a potential not lower than 1.2 V and whose negative electrode potential is not higher than 0.8 V relative to the potential of lithium at the end of the charging process in the initial cycle. Therefore, the two batteries can be and should be clearly discriminated.

Additionally, since a carbon material intercalates and deintercalates lithium ions in a potential region lower than the reduction potential of the non-aqueous solvent, a battery employing a carbon material has limits in terms of service life and operation characteristics at high temperature. On the other hand, lithium titanate intercalates and deintercalates lithium ions in a relatively high potential region so that a battery employing lithium titanate is overwhelmingly advantageous in terms of service life and operation characteristics at high temperature.

INDUSTRIAL APPLICABILITY

A non-aqueous electrolyte battery according to the present invention suppresses gas generation and also the increase in the battery thickness. Therefore, it can find applications in flat type batteries and batteries having a sheath of metal resin laminate film.

The invention claimed is:
1. A method of using a non-aqueous electrolyte battery comprising a non-aqueous electrolyte containing an electrolytic salt and a non-aqueous solvent, a positive electrode and a negative electrode having a negative active material that intercalates/deintercalates lithium ions at a potential not lower than 1.2 V relative to the potential of lithium, the method comprising:
    performing an initial charge/discharge of the non-aqueous electrolyte battery by lowering the potential of the negative electrode to an initial region that is not higher than 0.3 V relative to the potential of lithium at least once before operating the non-aqueous electrolyte battery so as to form a film coat having a carbonate structure and a thickness of not less than 10 nm on a surface of said negative electrode; and
    operating the non-aqueous electrolyte battery in an operating region of the potential of the negative electrode that is higher than 0.8 V relative to the potential of lithium.
2. The method of using a non-aqueous electrolyte battery according to claim 1, wherein the thickness of the film coat having the carbonate structure of said non-aqueous electrolyte battery is not less than 20 nm.
3. The method of using a non-aqueous electrolyte battery according to claim 1, wherein said negative active material of said non-aqueous electrolyte battery is spinel type lithium titanate.
4. The method of using a non-aqueous electrolyte battery according to claim 1, wherein the battery is designed so that the potential of the positive electrode is not higher than 4.5 V relative to the potential of lithium when the potential of the negative electrode of said non-aqueous electrolyte battery is not higher than 0.3 V relative to the potential of lithium.
5. The method of using a non-aqueous electrolyte battery according to claim 1, wherein there exists lithium showing a spin-lattice relaxation time ($T_1$) of not less than 1 second as determined by a solid Li-NMR observation in said negative active material of said non-aqueous electrolyte battery.
6. The method of using a non-aqueous electrolyte battery according to claim 1, wherein a collector of said negative electrode of said non-aqueous electrolyte battery is made of copper, nickel or an alloy of such metals.
7. The method of using a non-aqueous electrolyte battery according to claim 1, wherein the film coat having the carbonate structure is formed from the non-aqueous solvent having the carbonate structure.
8. The method of using a non-aqueous electrolyte battery according to claim 7, wherein the non-aqueous solvent having the carbonate structure is at least one selected from the group consisting of ethylene carbonate, propylene carbonate, vinylene carbonate, dimethyl carbonate, methylethyl carbonate, diethyl carbonate, tetrahydrofuran, 2-methyltetrahydrofuran, dimethoxyethane, butylolactone, acetonitrile, and sulfolane.

* * * * *